United States Patent [19]

Galasso et al.

[11] 4,456,634
[45] Jun. 26, 1984

[54] REACTION SINTERED SILICON CARBIDE

[75] Inventors: Francis S. Galasso, Manchester; John J. Brennan, Portland, both of Conn.

[73] Assignee: United Technologies Corporation, Hartford, Conn.

[21] Appl. No.: 332,025

[22] Filed: Dec. 18, 1981

Related U.S. Application Data

[63] Continuation-in-part of Ser. No. 159,577, Jun. 16, 1980, abandoned.

[51] Int. Cl.$^3$ .............................................. B05D 3/04
[52] U.S. Cl. .................................. 427/228; 427/180; 427/249; 427/344; 427/255.4; 423/345; 428/446; 501/88
[58] Field of Search ................. 427/226, 228, 180, 93, 427/249, 344, 255.4; 423/345; 106/44

[56] References Cited

U.S. PATENT DOCUMENTS

| | | | |
|---|---|---|---|
| 2,784,112 | 3/1957 | Nicholson | 106/44 X |
| 3,368,871 | 2/1968 | O'Connor et al. | 23/208 |
| 4,054,708 | 10/1977 | Robba et al. | 428/220 |
| 4,252,860 | 2/1981 | Brennan | 427/402 |

Primary Examiner—Shrive P. Beck
Attorney, Agent, or Firm—C. G. Nessler

[57] ABSTRACT

The impact resistance of hot pressed silicon carbide articles is improved by providing thereon a layer of material resulting from the reaction of silicon in a dilute hydrocarbon gas atmosphere. To form the impact absorbing layer of porous silicon carbide, a silicon powder compact is heated at about 1400° C. in a gas stream comprised predominantly of a carrier gas such as hydrogen, with a reactive hydrocarbon gas such as methane. Unitary articles may also be formed.

3 Claims, No Drawings

REACTION SINTERED SILICON CARBIDE

This application is a continuation-in-part of application Ser. No. 159,577, filed June 16, 1980, now abandoned.

Background Art

1. The present invention relates to reaction sintered silicon carbide structures with improved impact strength.

2. Silicon carbide base ceramic materials are used in their sintered and hot pressed form in various high temperature structural applications. In demanding applications, such as vanes and blades for gas turbine engines, the properties required include not only high temperature strength, corrosion and oxidation resistance, but resistance to sporadic impact damage from projectiles. Silicon carbide, like many other ceramic materials, is found in materials tests to have relatively low energy of fracture.

In practice, this limited resistance to impact damage limits the utility of the materials and various approaches have been utilized to try to impart improved properties to ceramic articles. For example, metal fibers and other rod-like structures have been integrated with the ceramic, but this approach has met with only limited success due to the limitations imposed by the properties of the metals. Another approach utilized has been to provide a crushable surface layer on the ceramic. For example, duplex silicon carbide structures comprised of a fully sintered high density substrate in combination with an integral partially sintered and densified silicon carbide surface layer are described in the Reports No. NASA CR-134990 and NASA CR-134921, "Improved Toughness of Silicon Carbide", J. A. Palm, (published by the General Electric Co. for National Aeronautics and Space Administration, Washington, D.C. 1975-1976). A limitation of this duplex approach is that the component surface must be formed to final shape in fabrication, without subsequent machining, elsewise the energy absorbing layer will be removed.

For silicon nitride base ceramics, a porous impact energy absorbing surface layer may be provided by partially nitriding a slurry of silicon powder which is deposited on a component surface, as described in our copending U.S. patent application Ser. No. 054,522, filed July 2, 1979 now U.S. Pat. No. 4,252,860. Silicon nitride is commonly formed by reaction sintering, i.e., heating silicon in a nitrogen atmosphere, but there is not a typical analogous process for forming silicon carbide articles; sintering of the easily formed carbide particles is prevalent.

Diclosure of Invention

An object of the invention is to form a silicon carbide material which when applied to a dense silicon carbide article will improve its resistance to impact damage. A further object is to form unitary articles of silicon carbide.

According to the invention, silicon carbide material is made by first forming a compact of silicon powder, and then heating the compact at a high temperature in a gas stream. The gas stream is comprised predominantly of a non-reactive carrier gas, such as hydrogen; the other component of the gas stream is a reactive hydrocarbon gas, such as methane, which pyrolyzes to produce carbon. When the proportion of hydrocarbon in the gas stream is properly controlled (in the range of 1:3 for methane:hydrogen) and the temperature is sufficiently high (about 1400° C.) silicon carbide will be formed, after a period of time dependent on the thickness of the silicon compact and the temperature. The use of the carrier as a diluent is important: when too much hydrocarbon gas is present carbon is deposited as a relatively impervious layer which inhibits the ready formation of the desired silicon carbide material. With the proper amount, an apparent different and more effective type of deposit results.

Silicon carbide is formed by the foregoing process on a previously made article by first depositing a powder mixture, as by a slurry. After reaction the deposit is found to be relatively porous but adherent to the article. Specimen tests show the relatively porous layer provides a substantial increase in impact resistance to a hot pressed specimen. The process also provides a new way to make unitary articles.

Best Mode for Carrying Out the Invention

The approach to providing silicon carbide with improved impact resistance, in the present invention, involves forming a relatively porous impact absorbing layer on the surface. Since silicon carbide structures have special properties, the porous layer is likewise silicon carbide. The preferred embodiment is described in terms of forming such a layer on a structure, but it will be evident that unitary structures may be formed of the layer material as well.

The initial approach for creating a porous layer was to compact $-325$ mesh silicon powder and react it with methane. However when the silicon compact was reacted with methane at 1350° C., some silicon carbide was formed but most of the compact remained silicon. In addition a thick carbon coating was deposited on the compact surface. To overcome this problem the reaction temperature was lowered to 1250° C. and hydrogen was mixed with the methane, but under these conditions no silicon carbide formation was observed. In another test, some silicon carbide was formed after 5.5 hours at 1325° C.; this same sample was found to be mostly converted to silicon carbide when it was reheated to 1400° C. to two hours.

The optimum conditions for forming a porous silicon carbide surface layer were thus deduced. A slurry of $-325$ silicon powder and water was applied to the surface of a hot pressed silicon carbide material (NC-203 silicon carbide obtained from the Norton Company, Worcester, Mass.). The water was evaporated and the sample was placed in a furnace at 1400° C. for five hours under a flow, by volume, of 3 parts $H_2$ and 1 part $CH_4$. Upon cooling and removal from the furnace, some porous carbon deposits were observed. These were removed by reheating the sample at 600° C. in air, whereupon the carbon was converted to its gaseous oxides. X-ray diffraction studies showed that the silicon powder coating had been converted to silicon carbide; the structure was observed to be porous.

A test specimen with a 2 mm thick porous silicon carbide layer was measured for impact strength in a Charpy type test and found to be 1.2 joules (0.9 ft. pounds), as compared to 0.2 joules (0.15 ft. pounds) for similar material without the coating. Thus, impact strength is increased more than five-fold.

The aforementioned examples show that silicon carbide can be formed by reaction sintering of silicon metal under properly controlled conditions. First a compact is formed. By compact is meant a close aggregation of particles with strength sufficient for handling. The application of a slurry to an article is an embodiment of slip casting; other volatile vehicles than water, such as liquid hydrocarbons may be used. Alternately cold pressing may be used. (If the reaction sintered silicon carbide is to be formed as a unitary structure instead of a coating, then a free-standing compact may be formed.) The powder is preferably −325 mesh but coarser or finer powder may be used. Larger particles will form more porous structures but may require somewhat greater time for carbon diffusion. For impact absorption porosity in the compact is desired and this will be perpetuated in the reaction-formed silicon carbide. For unitary articles it may be desired to achieve less porosity be greater densification of the compact prior to reaction.

During the reaction a carbon bearing gas must be present and the gas must pyrolyze to deposit carbon on the silicon. We have found that when 100% methane hydrocarbon gas is used a relatively impervious coating of carbon was formed on the silicon surface. This coating apparently had a structure which made it less interactive with the silicon and thus the desired conversion of all the silicon was not accomplished. Thus, according to our invention, the methane mixture is diluted by a carrier gas. The dynamics of our new process have not been well investigated and are not fully understood. However, it appears the diluent carrier gas alters the character of the carbon deposit in a manner which makes it move easily combinable with all the silicon. Preferably, hydrogen is used as the carrier, since it provides a reducing atmosphere, but other carrier gases and mixtures, such as argon and helium, with or without hydrogen, are used as well. The desired carrier is characterized in general as being "non-reactive", and by this is meant that the carrier gas does not interact with the silicon during the inventive process. If hydrocarbon gases other than methane, such as ethane or propane, are used, they will contain higher proportional amounts of carbon and may have different pyrolyzation dynamics. Thus, the volumetric percentage of hydrocarbon gas in the stream will most likely be adjusted accordingly to a lower level to carry out the object of the invention without forming undesired impervious carbon coating.

The reaction temperature is preferably 1400° C., but may be varied somewhat from that level. Preferably, the temperature is as high as possible, while avoiding melting of the silicon compact. Inasmuch as we believe the carbon to be almost solely deposited on the exposed surface of the compact, the highest possible temperature is desirable to cause interdiffusion of the carbon through the silicon compact.

As has been stated, the sample when removed from the reaction chamber will have a residual deposit of carbon. The structure may be used in this condition or, as indicated, the carbon may be removed by heating in air at a temperature sufficient to cause oxidation. Thus, the 600° C. post-reaction temperature may be varied therefrom as suited, mostly to obtain a quicker result.

Although this invention has been shown and described with respect to a preferred embodiment thereof, it should be understood by those skilled in the art that various changes and omissions in the form and detail thereof may be made therein without departing from the spirit and scope of the invention.

We claim:

1. The method of improving the impact resistance of a silicon carbide article which comprises:
    applying a porous silicon powder compact to the surface of the article;
    heating the article and compact to a temperature of about 1400° C. in a gas stream comprised of a non-reactive carrier gas selected from the group hydrogen, helium, argon, and mixtures thereof, in combination with a reactive hydrocarbon gas, the volume ratio of non-reactive gas to reactive gas at least about 3:1 to provide carbon for reaction with the silicon powder compact without depositing an impervious layer thereon, thereby forming a porous silicon carbide structure which, when adhered in a thickness of 2 mm to a hot pressed silicon carbide Charpy type test specimen, provides more than 5-fold increase in impact strength.

2. The method of claim 1 wherein the carrier gas is hydrogen and the reactive gas is methane.

3. The method of claim 2 wherein the volume ratio of hydrogen to methane is 3:1.

* * * * *